United States Patent [19]

Steele et al.

[11] 4,160,155

[45] Jul. 3, 1979

[54] TAXIMETER INDICATING DEVICES

[75] Inventors: David J. Steele, Newnham; Andrew I. O. McLean, Northampton; Martin B. Anderson, London, all of England

[73] Assignee: Plessey Handel und Investments A.G., Zug, Switzerland

[21] Appl. No.: 880,061

[22] Filed: Feb. 22, 1978

[51] Int. Cl.² .............................................. G07B 13/00
[52] U.S. Cl. ........................... 235/92 TC; 235/30 R; 235/92 PL; 364/467
[58] Field of Search .................. 364/467; 235/92 TC, 235/92 DN, 30 R, 45, 92 PL; 340/68

[56] References Cited

U.S. PATENT DOCUMENTS

| | | | |
|---|---|---|---|
| 3,764,782 | 10/1973 | Spauszus et al. | 235/92 TC |
| 3,843,874 | 10/1974 | Kelch | 364/467 |
| 3,860,807 | 1/1975 | Fichter et al. | 364/467 |
| 3,880,350 | 4/1975 | Iwatani et al. | 235/92 TC |
| 3,917,934 | 11/1975 | Goto | 364/467 |
| 3,970,827 | 7/1976 | Ikuta et al. | 235/92 TC |
| 3,983,378 | 9/1976 | Tammi | 364/467 |
| 4,001,560 | 1/1977 | Larsen | 364/467 |

*Primary Examiner*—Errol A. Krass
*Attorney, Agent, or Firm*—Fleit & Jacobson

[57] ABSTRACT

An indicating device is provided, especially in the form of a taximeter which comprises counter means which is clocked by time pulses applied to it and which is reset by distance pulses applied to it and when it reaches a predetermined count, the counter means being arranged to afford an output each time it is reset and means being provided operable on the distance pulse immediately following the counter means having assumed said predetermined count for producing an output in dependence upon the residual count of said counter means on the application thereto of the said distance pulse for affording a correction pulse that is effectively subtracted from the output afforded by the counter means to afford a corrected pulse train that is used to compute a fare to be charged.

3 Claims, 17 Drawing Figures

TAXIMETER INDICATING DEVICES

This invention relates to indicating devices and relates more especially to charge indicating devices such as taximeters.

In our co-pending patent application No. 778,972 now U.S. Pat. No. 4,118,775, there is described an arrangement for use in a taximeter for computing a fare to be charged, the fare charge being based on a combination of the distance travelled and/or, if the speed of the taxi falls below a predetermined threshold, on the time the taxi is being hired. Normally, it is required that at speeds greater than the threshold speed the fare to be charged is based on distance travelled as determined by so-called distance pulses and at speeds less than the threshold speed is based on the elapsed time as determined by so-called time pulses. In both of these regions, operation is straightforward and accurate but inaccuracies can occur at the point the transition is made from distance to elapsed time and vice-versa due to long averaging times required to detect the transition and due to the time and distance pulse trains not having a defined phase relationship at the transition point.

The present invention is concerned with an arrangement for use in a taximeter for computing the fare to be charged which is more accurate than other known methods.

According to the present invention there is provided an indicating device especially in the form of a taximeter comprising counter means which is clocked by time pulses applied to it and which is reset by distance pulses applied to it and when it reaches a predetermined count, the counter means being arranged to afford an output each time it is reset and means being provided operable on the distance pulse immediately following the counter means having assumed said predetermined count for producing an output in dependence upon the residual count of said counter means on the application thereto of the said distance pulse for affording a correction pulse that is effectively subtracted from the output afforded by the counter means to afford a corrected pulse train that is used to compute a fare to be charged.

In carrying out the invention, the counter means may take the form of a countdown counter which is resettable to a count of N and which is arranged to count down towards zero under the control of the time pulses applied thereto, the countdown counter being arranged to be reset on reaching a count of zero and when a distance pulse is applied to it and further being arranged to afford an output pulse each time it is reset, means being provided for accumulating the count of the countdown counter when it is reset by a distance pulse immediately after having attained a count of zero, it being arranged that when the accumulated count attains a count of N a pulse is effectively subtracted from the output pulses afforded by the countdown counter to afford a corrected output, and a count of N is subtracted from the accumulated count.

In a preferred arrangement according to the present invention, the indicating means will comprise microprocessor means in which case the invention will be implemented in software form but in an alternative arrangement the invention may be implemented in hardware form.

An exemplary embodiment of the invention will now be described, reference being made to the drawings accompanying the Provisional Specification in which.

The principle of operation of the present invention is to provide distance pulses derived from a transducer arrangement fixed to the vehicle transmission and typically producing pulses at about one a second at the threshold speed and time pulses at a frequency that is accurately defined and is sufficiently high for say 100 time pulses to occur at the threshold speed in the period between adjacent distance pulses. Instead of using one or other of these pulse trains dependent upon whether the absolute speed is greater than or less than the threshold speed as is one known arrangement, it is proposed, according to the present invention, to effectively combine both pulse trains and to effect a correction to the combined pulse train to take into account excess pulses that should not be included.

This is achieved by providing a divide N countdown counter which is clocked by the clock pulses, the division ratio N corresponding precisely to the number of time pulses per distance pulse at the threshold speed. Every time a distance pulse occurs the countdown counter is arranged to be reset to N and proceeds to count towards zero by means of the applied time pulses and every time the count of the countdown counter reaches zero before a distance pulse is received, it is reset to N and again is counted down towards zero by time pulses. Each time the countdown counter is reset to N a pulse is generated which is used to compute the fare to be charged in the normal way. However, it is found that at speeds greater than a threshold speed the generated output corresponds to the distance pulses and is satisfactory but at speeds less than the threshold speed error is introduced due to too many pulses being generated and it can be shown that this error is dependent upon the count of the countdown counter when it is reset by a distance pulse. It is therefore proposed to monitor the count of the countdown counter each time it is reset by a distance pulse and immediately after having been reset due to it reaching a count of zero and to accumulate this count and arrange that each time the accumulated count exceeds the number N a pulse is subtracted from the generated pulse train.

Figure 1:
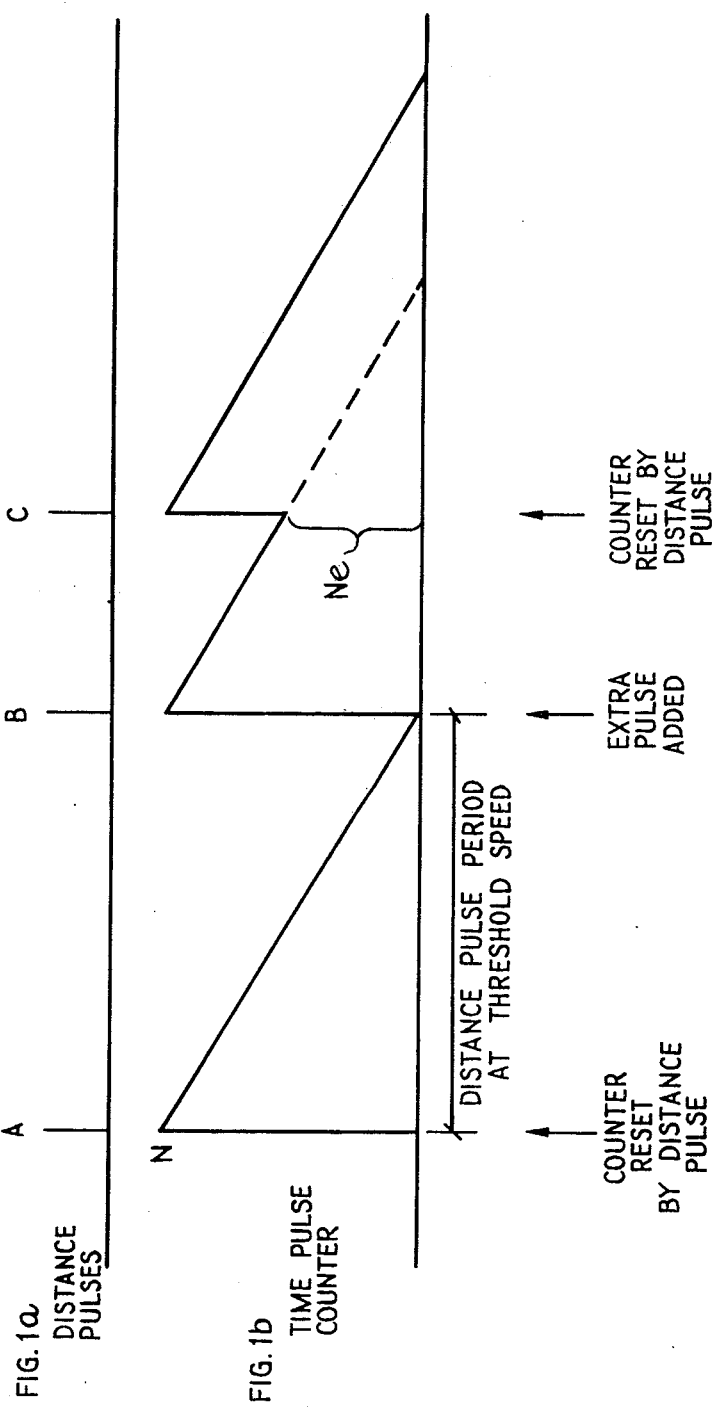
FIGS. 1a and 1b, depict waveforms illustrating the principle of operation of an arrangement in accordance with the present invention.

Considering now the waveforms shown in FIG. 1 of the drawings, in FIG. 1a typical distance pulses occurring at points A and C are shown and in FIG. 1b the count of the divide-by-N countdown counter is shown, this being set to a count of N on the receipt of each distance pulse and being arranged to count down towards zero under the control of time pulses. If the count of the countdown counter reaches zero as at 'B' in FIGS. 1a and 1b it is reset to N and is again counted down. Each time the countdown counter is reset an output pulse is generated so that in the example considered in FIG. 1 an output pulse would be generated at points A, B and C. However, it is found that since at point C the counter was reset during its countdown cycle an error is introduced and this error is dependent upon the count Ne of the countdown counter when it is reset by a distance pulse as at point C. This may be overcome by arranging the successive counts of Ne are accumulated and when the accumulated count exceeds the count N a pulse is subtracted from the generated pulse train. This may be better illustrated from the waveform diagrams of FIGS. 2 and 3 which depict waveforms that exist at speeds less than and greater than a threshold speed respectively.

Figure 2:
FIGS. 2a–2f, depict various waveforms that exist in an arrangement according to the present invention at speeds greater than a threshold speed.
Figure 2:
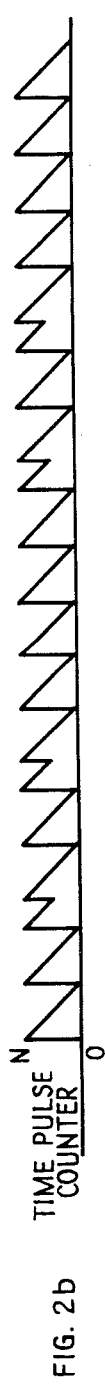
Figure 2:
Figure 2:
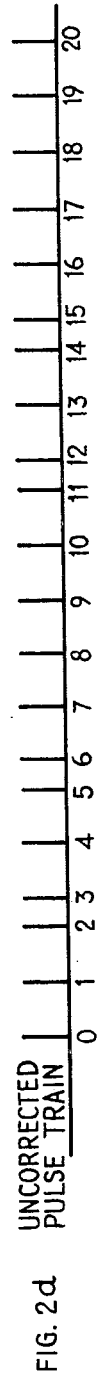
Figure 2:
Figure 2:

Considering FIG. 2, in FIG. 2a there are shown a series of distance pulses and in FIG. 2b there is shown the count of a countdown counter which is clocked by the time pulses and is reset at each distance pulse and when it reaches a count of zero. It is arranged that a pulse is generated each time the counter is reset so that an uncorrected pulse train as shown at FIG. 2d in FIG. 2. Also, each time the countdown counter reaches a count of zero it is arranged that a "flag" as shown at FIG. 2c in FIG. 2 is set, the flag being reset on the receipt of the next distance pulse. In order to correct the uncorrected pulse train shown in FIG. 2d, it is arranged that when the counter is reset by a distance pulse, if the flag has been set, the count existing in the counter at that time is transferred to an error accumulator as shown at FIG. 2e. When the count of the error accumulator reaches a count of N a pulse is subtracted from the uncorrected pulse train to afford a corrected pulse train as shown at FIG. 2f in FIG. 2. This corrected pulse train may thus be used to compute the fare to be charged.

Figure 3:
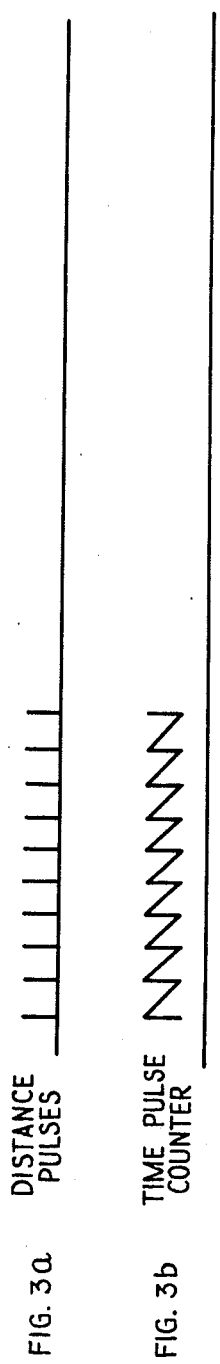
FIGS. 3a–3f, depict various waveforms that exist in an arrangement according to the present invention at speeds less than a threshold speed.
Figure 3:
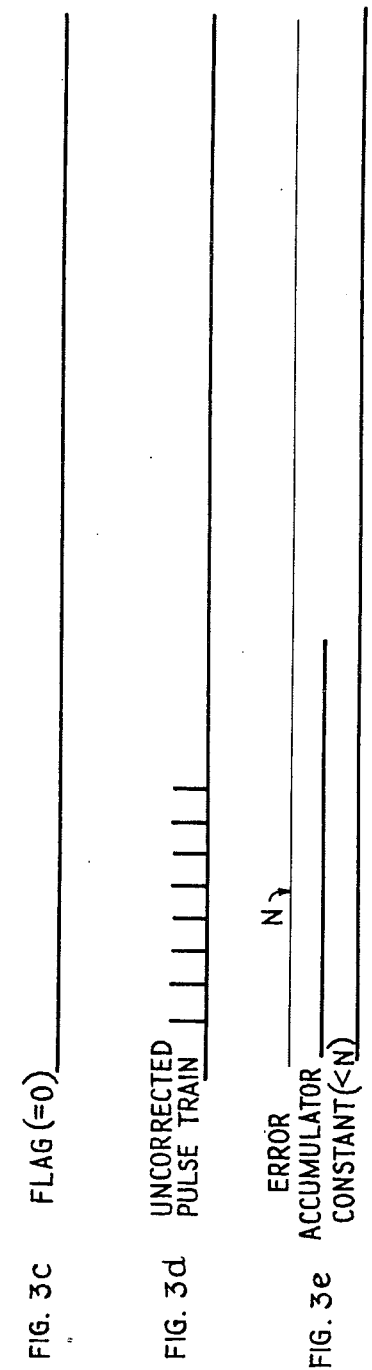
Figure 3:
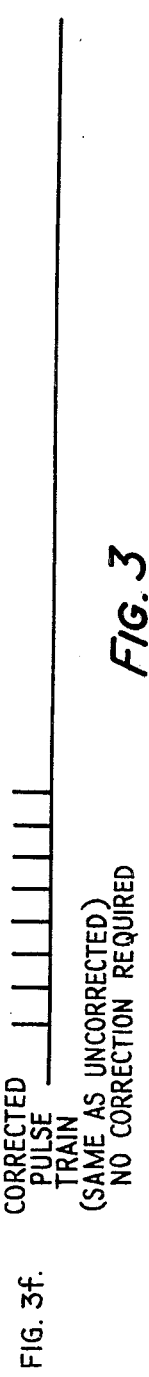

In FIG. 3 there is depicted the same waveforms as those depicted in FIG. 2 but this time modified to show what obtains when the speed is greater than a threshold speed. Thus in FIG. 3a a series of distance pulses are shown and in FIG. 3b the count of the countdown counter is shown, this being clocked by the time pulses and reset on the receipt of each distance pulses, the position being that due to the speed being greater than a threshold speed, the spacing between the distance pulses is such that the count of the counter is reset each time before it reaches zero. Thus the 'flag' as depicted in FIG. 3c is never set and the uncorrected pulse train as depicted in FIG. 3d corresponds to the distance pulse train of FIG. 3a. As indicated in FIG. 3e the error indicated by the error accumulator depicted in FIG. 3e is constant at a value less than N so that no correction pulses are generated with the result that the corrected pulse train depicted in FIG. 3f is the same as the uncorrected pulse train of FIG. 3d which as stated above corresponds to the distance pulses of FIG. 3a.

The system described for generating a pulse train on which to base the computation of a fare to be charged in a taximeter based on distance and time pulses may be effected in software form in taximeters which make use of micro-processor or micro-computer techniques or in hardware form in other forms of electronic taximeter.

Figure 4:
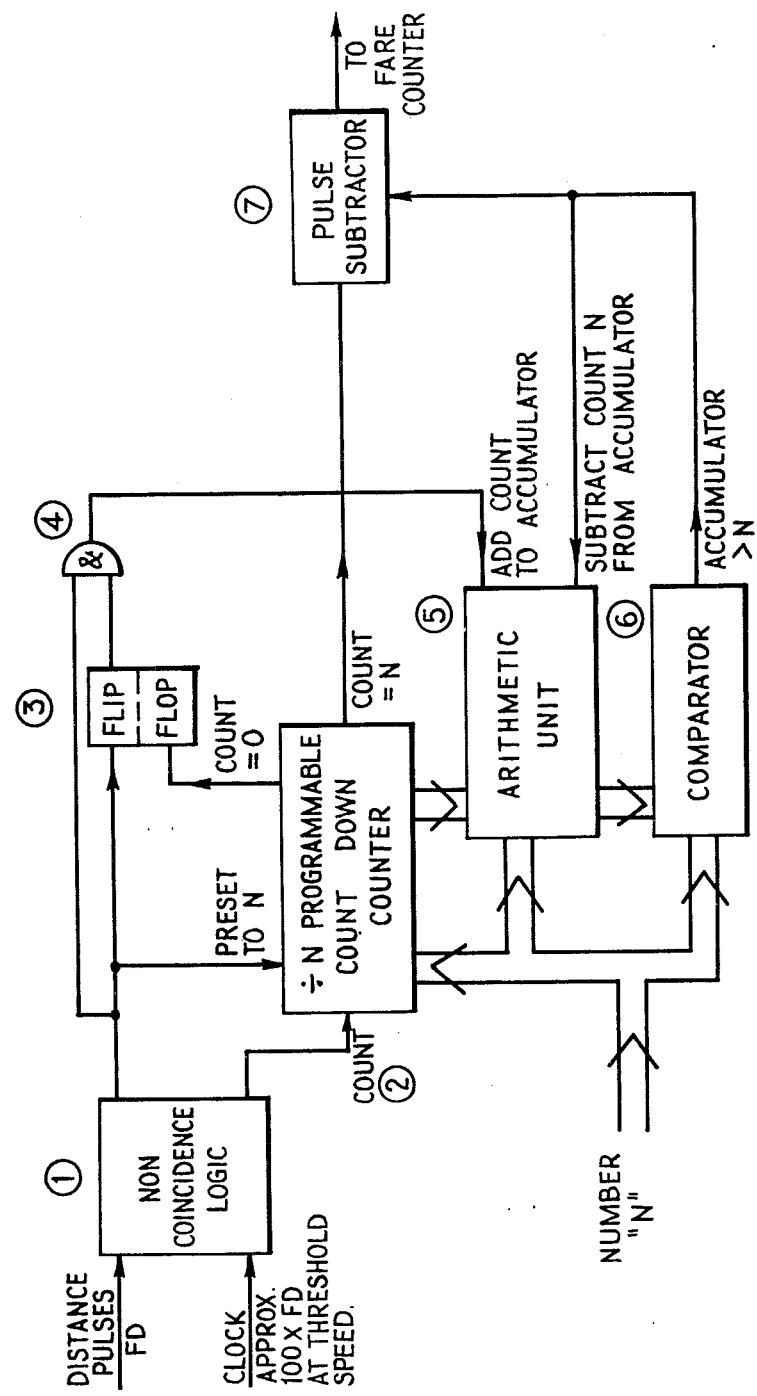
FIG. 4, depicts a hardware implementation of an arrangement according to the present invention.

In FIG. 4 of the accompanying drawings, there is shown a typical hardware implementation time pulses and distance pulses are applied to a non-coincidence logic circuit 1 which prevents coincident pulses with correct system operation. The time pulses from the non-coincidence logic circuit 1 are applied as clock pulses to a divide by N programmable countdown counter 2 to which the distance pulses from the non-coincidence logic circuit 1 are also applied so as to cause the counter 2 to be reset to a count of N. Each time the counter 2 is reset to a count of N an output is afforded on a 'count N' output which is applied via a pulse subtractor 7 to a fare counter not shown. Under quiescent conditions the pulse subtractor 7 is maintained non-operational. However, if the count of the counter 2 reaches a count of 0, this is indicative of the vehicle speed being less than the threshold speed and a count 0 output is afforded to a flip-flop 3 to bring the error correcting system into operation. When the next distance pulse, after a count of 0 has set flip-flop 3, occurs, it is gated through an AND gate 4 to an arithmetic unit 5 which causes the count of the counter 2 to be added to an accumulator in the arithmetic unit 5 before the counter 2 is reset. The accumulated error in the arithmetic unit 5 is compared with the number 'N' in a comparator 6, and when the accumulated error exceeds the number N, the comparator affords an output which is applied to the pulse subtractor 7 to prevent a pulse from the counter 2 from being fed to the fare counter and is also applied to the arithmetic unit 5 to cause the accumulator therein to be reduced by a count of N. The process is then repeated, the output from the pulse subtractor 7 corresponding to the required corrected pulse train.

Figure 5:
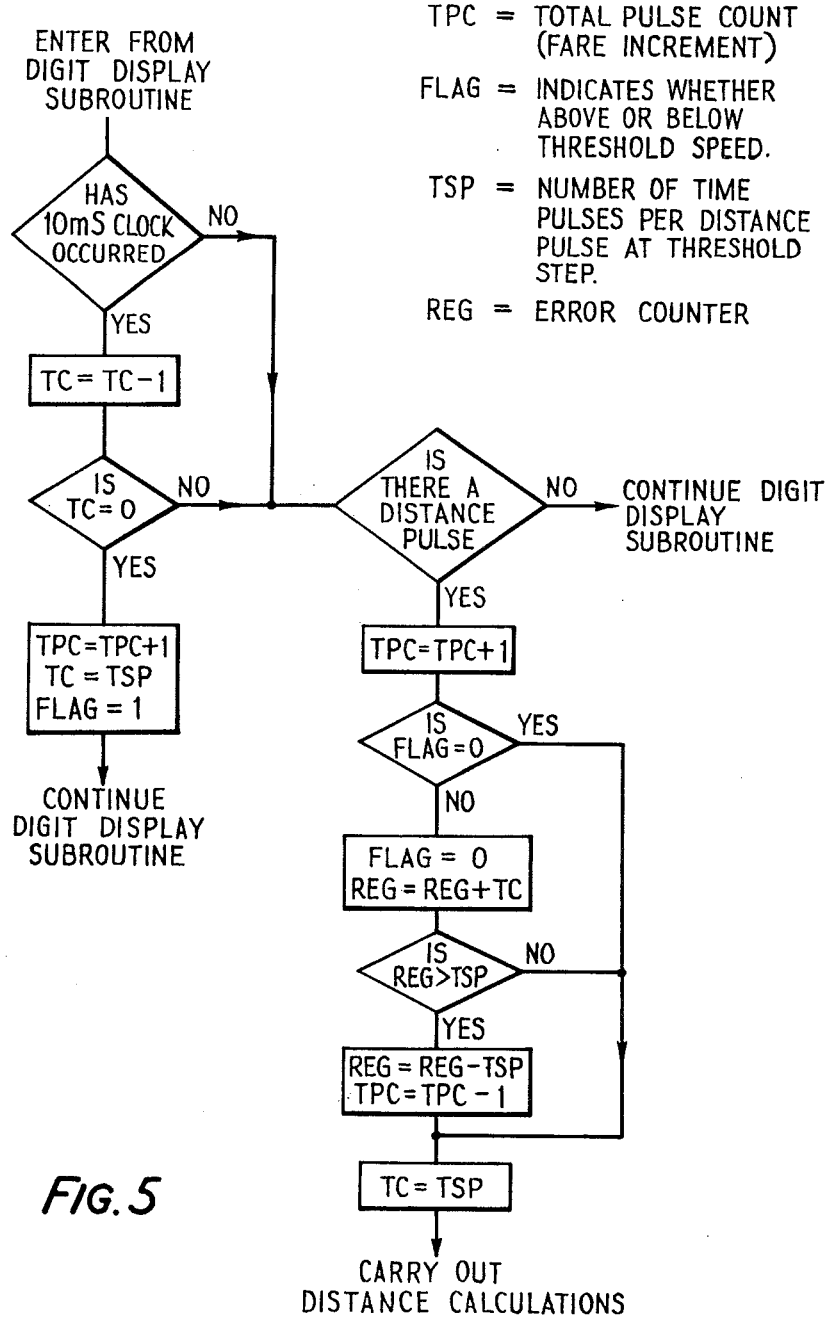
FIG. 5, depicts a software flowchart implementation of an arrangement according to the present invention; and, FIG. 6, shows in more detail the software flowchart of FIG. 5, written in a form suitable for incorporation in a taximeter.
Figure 6:
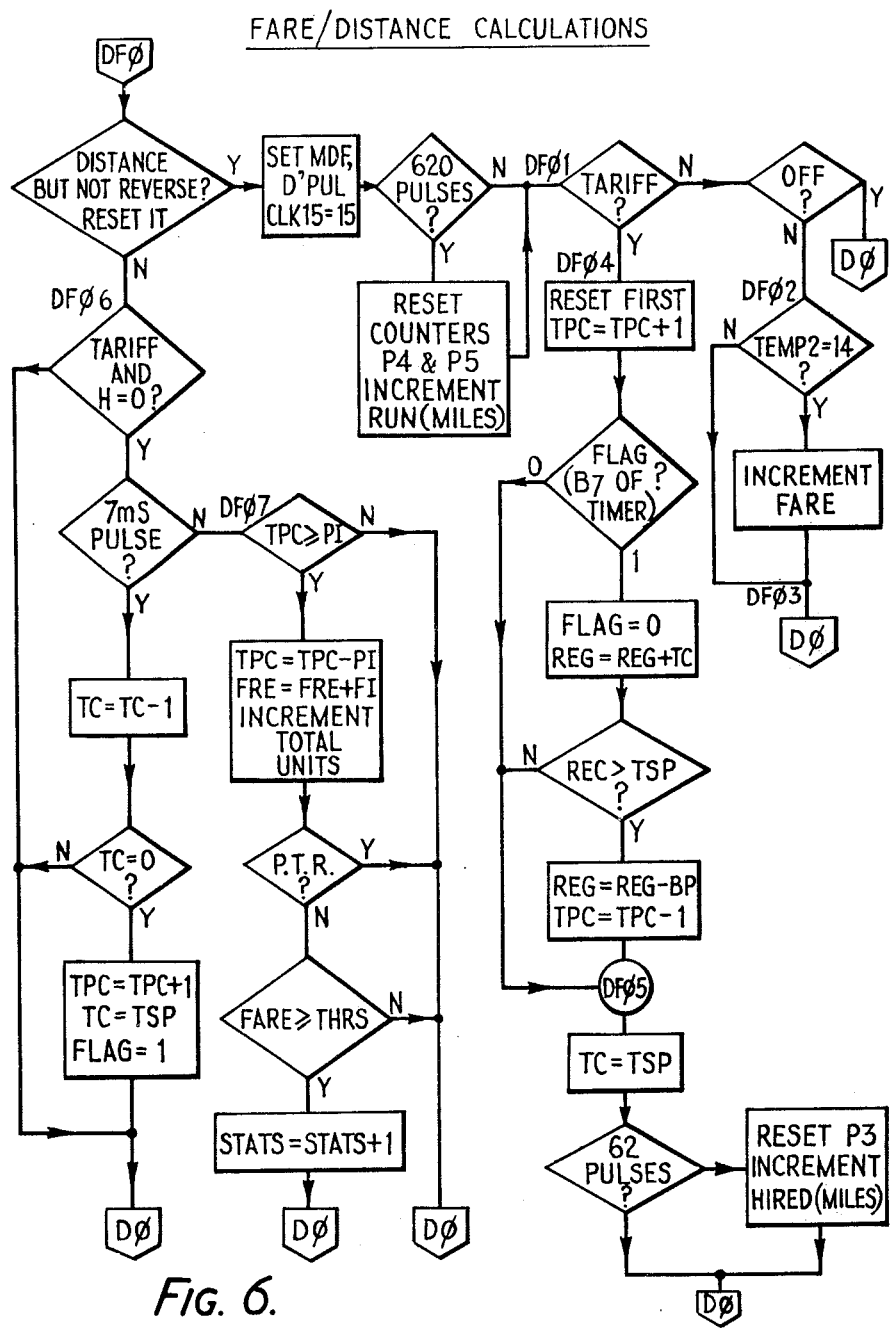

A software implementation of the system is shown in flowchart form in FIG. 5 and in more detailed flowchart form suitable for incorporation in a taximeter in FIG. 6. The operation of both of these is considered to be self-explanatory in the form depicted without detailed description.

What we claim is:

1. In a charge indicating device for a taximeter that is responsive to distance pulses proportional to the distance traveled, and time pulses proportional to the time elapsed, the improvement comprising counter means for performing a predetermined count, the counter means being reset on reaching the said count; said counter means including the counter clock input means for receiving the time pulses whereby the counter is clocked towards the predetermined count, and counter reset input means for receiving the distance pulses whereby the counter is reset when each distance pulse is received; counter output means for providing an output pulse whenever the counter means is reset; residual count sensing means for sensing a residual count of the counter means when reset by a first distance pulse immediately following the reaching of the said predetermined count; and subtraction means for receiving output pulses provided by the counter output means and for subtracting a pulse in dependence upon the said residual count whereby the subtraction means provides a pulse train representative of an indicated charge.

2. An indicating device as claimed in claim 1, wherein said counter means is a count down counter which counts down from a count of N to zero, and the residual count sensing means includes accumulating means for accumulating the said residual count of the counter means, and means for providing a correction pulse to the subtraction means for subtraction therein when the accumulating means reaches an accumulated count of N wherein a count of N is subtracted from the accumulated residual count.

3. An indicating device as claimed in claim 2, in which the means for providing a correction pulse comprises comparator means for comparing the accumulated count with a preset number N.

* * * * *